(12) United States Patent
Zeygerman

(10) Patent No.: US 8,574,487 B2
(45) Date of Patent: *Nov. 5, 2013

(54) WORKPIECE PROCESSING USING A BEAM

(75) Inventor: Leonid Zeygerman, West Hartford, CT (US)

(73) Assignee: Trumpf, Inc., Farmington, CT (US)

( * ) Notice: Subject to any disclaimer, the term of this patent is extended or adjusted under 35 U.S.C. 154(b) by 583 days.

This patent is subject to a terminal disclaimer.

(21) Appl. No.: 12/755,128

(22) Filed: Apr. 6, 2010

(65) Prior Publication Data

US 2010/0252538 A1    Oct. 7, 2010

Related U.S. Application Data

(60) Provisional application No. 61/167,289, filed on Apr. 7, 2009.

(51) Int. Cl.
*B23K 26/02* (2006.01)

(52) U.S. Cl.
USPC ............................................. 266/49; 266/48

(58) Field of Classification Search
USPC ................................................ 266/44, 48, 49
See application file for complete search history.

(56) References Cited

U.S. PATENT DOCUMENTS

| | | |
|---|---|---|
| 3,486,744 A | 12/1969 | Beyers et al. |
| 4,345,744 A | 8/1982 | Leibinger et al. |
| 5,049,723 A | 9/1991 | Macdonald |
| 6,300,592 B1 | 10/2001 | Ulrich et al. |
| 7,682,555 B2 * | 3/2010 | Annas ............................... 266/49 |
| 2003/0034336 A1 | 2/2003 | Erlenmaier et al. |
| 2004/0232120 A1 | 11/2004 | Wessner |
| 2007/0151958 A1 | 7/2007 | Modra |
| 2008/0230523 A1 | 9/2008 | Graf |
| 2010/0252542 A1 * | 10/2010 | Zeygerman ............... 219/121.67 |

FOREIGN PATENT DOCUMENTS

| | | |
|---|---|---|
| CN | 101032787 | 9/2007 |
| CN | 200945548 | 9/2007 |
| DE | G9201827.0 | 5/1992 |
| DE | G 9201827 | 7/1992 |
| DE | 4210518 | 10/1993 |
| DE | 102006035895 | 2/2008 |
| DE | 102007027987 | 10/2008 |
| FR | 2702980 | 9/1994 |
| JP | 61020680 | 1/1986 |
| JP | 61286086 | 12/1986 |
| JP | 62187590 | 8/1987 |
| JP | 62224490 | 10/1987 |

(Continued)

OTHER PUBLICATIONS

Notification of Transmittal of the International Search Report and the Written Opinion of the International Search Authority for corresponding PCT Application No. PCT/US2010/030056, mailed Jul. 9, 2010, 13 pages.

*Primary Examiner* — Scott Kastler
(74) *Attorney, Agent, or Firm* — Fish & Richardson P.C.

(57) ABSTRACT

A cutting machine includes a suction duct that is movable with a cutting head of the cutting machine, using a common drive. The suction duct is disposed beneath the workpiece support and coupled to the motion unit supporting the cutting head so that it moves with the motion unit while an opening of the suction duct remains positioned below the cutting head during a cutting operation. The suction duct removes cutting debris and dust, and protects underlying machine components from beam damage.

20 Claims, 9 Drawing Sheets

(56) References Cited

FOREIGN PATENT DOCUMENTS

| | | |
|---|---|---|
| JP | 63063596 | 3/1988 |
| JP | 1166895 | 6/1989 |
| JP | 02263572 | 10/1990 |
| JP | 04105785 | 4/1992 |
| JP | 6055290 | 3/1994 |
| JP | 6297181 | 10/1994 |
| JP | 8132270 | 5/1996 |
| JP | 10137943 | 5/1998 |
| JP | 10225789 | 8/1998 |
| JP | 2000263356 | 9/2000 |
| JP | 2008060614 | 3/2008 |
| WO | 2007028402 | 3/2007 |
| WO | 2007028403 | 3/2007 |
| WO | 2007028404 | 3/2007 |
| WO | 2007134629 | 11/2007 |
| WO | 2008151839 | 12/2008 |

\* cited by examiner

US 8,574,487 B2

WORKPIECE PROCESSING USING A BEAM

CROSS REFERENCE TO RELATED APPLICATION

Under 35 U.S.C. §119(e)(1), this application claims the benefit of prior U.S. provisional application 61/167,289, filed Apr. 7, 2009, the entire contents of which are hereby incorporated by reference.

TECHNICAL FIELD

This invention relates to workpiece processing systems using a beam to process a workpiece, such as laser cutting systems, for example.

BACKGROUND

During cutting of workpieces, such as metal sheets, with a beam (e.g., laser beam, flame or the like) it is generally necessary to remove debris and dust from the cutting area. This is often done using suction, typically using stationary, large volume suction chambers that are disposed beneath the workpiece support.

It has been proposed, in JP10137943, to provide a cutting system having a dust collecting device that is located under the workpiece support and that follows the cutting head using a separate drive.

SUMMARY

One aspect of the invention features a cutting machine that includes a workpiece support, a motion unit having an associated drive, and a cutting head mounted on the motion unit above the workpiece support and configured to deliver a cutting beam, such as a laser beam or a flame cutting beam, to process a workpiece supported on the workpiece support. Also provided is a suction duct disposed beneath the workpiece support and coupled to the motion unit so that it moves with the motion unit while an opening of the suction duct remains positioned below the cutting head during a cutting operation.

In some examples the suction duct features an elongated channel positioned beneath a workpiece support so as to intercept the cutting beam after it passes the workpiece support. The elongated channel is, in some implementations, defined by opposed walls of the suction duct, with each wall defining a plurality of spaced suction openings that are offset from suction openings on the other wall.

In some embodiments the suction duct defines a suction volume located between a pair of suction chambers that join at one end of the suction duct in an output chamber that is in communication with a suction channel. The output chamber may be connected to the suction channel by an output duct that is configured to move within the suction channel. In some cases a sealing device is provided, which is configured to seal the suction channel during movement of the output duct. The sealing device may include, for example, a pair of bellows, each bellow having two ends and being connected at one of its ends to the output duct.

In some examples, the suction duct features an elongated member, such as a shaft pivotable to open a discharge chute connected to the shaft, configured to absorb energy from the cutting beam when the cutting head is in operation. In some cases the shaft is hollow and is connected to a flow of liquid coolant. Preferably, the shaft is of a lateral extent sized to correspond to a width of the cutting beam at an elevation of the shaft. In some configurations, the shaft is laterally translatable with the discharge chute in an open position, to increase a discharge chute area.

Some examples of the machine further feature scrap drawers configured to receive parts and scrap discharged from the discharge chute. In some applications, the machine features ramp members, positioned below the shaft, forming sliding surfaces that direct parts and scrap into the scrap drawers.

In some embodiments, the machine includes a frame having a central frame member disposed beneath the suction duct and protected from beam energy by the suction duct. The central frame member may be advantageously configured to provide a lifting point from which the entire machine can be lifted and moved.

In some embodiments, the suction duct is connected to the motion unit through a force-limited connection that allows relative movement between the motion unit and suction duct in response to the suction duct encountering an obstruction during travel. The machine may include a shut-off switch responsive to relative movement between the suction duct and motion unit.

Another aspect of the invention features a method of cutting a workpiece, the method including delivering a cutting beam to an area of the workpiece from a cutting head mounted on a motion unit having a drive, while positioning an opening of a suction duct below the cutting beam, using the drive of the motion unit, and applying suction through the opening of the suction duct.

Preferably, the suction duct has a small volume, allowing a strong vacuum to be drawn using a relatively small and inexpensive vacuum unit. The cutting systems disclosed herein can provide a robust, simple and cost-effective solution to the problem of removing dust and debris from the cutting area during a cutting operation, while also enabling the incorporation of machine components below the workpiece support within the projected path of the beam.

The details of one or more embodiments of the invention are set forth in the accompanying drawings and the description below. Other features and advantages of the invention will be apparent from the description and drawings, and from the claims.

DESCRIPTION OF DRAWINGS

In FIG. 4, the chute member 18 is shown in three different positions: closed, rotated and rotated/displaced.

Like reference numbers indicate like elements.

DETAILED DESCRIPTION

The laser cutting system described in more detail below includes a beam interception unit, such as a suction duct, that is configured to move in coordination with motion of the cutting head, at least along one axis, which can be accomplished either by structurally connecting the suction duct with the processing head system, or by using separate drives controlled to provide the necessary motion coordination. The suction duct or other beam containment device has a relatively small suction volume, and thus does not require a large suction unit in order to obtain good removal of duct and debris. For example, in some cases the suction unit may have a suction capacity of less than about 700 m$^3$/h, or even less than 500 m$^3$/h. In some implementations, this allows a relatively low cost suction unit to be used, thereby reducing the overall cost of the cutting system without compromising its effectiveness. The suction duct is also designed to provide uniform suction across the entire cutting area of the cutting system. Moreover, the suction duct is designed to safely contain the cutting beam, allowing structures to be disposed below the suction duct.

Figure 1:
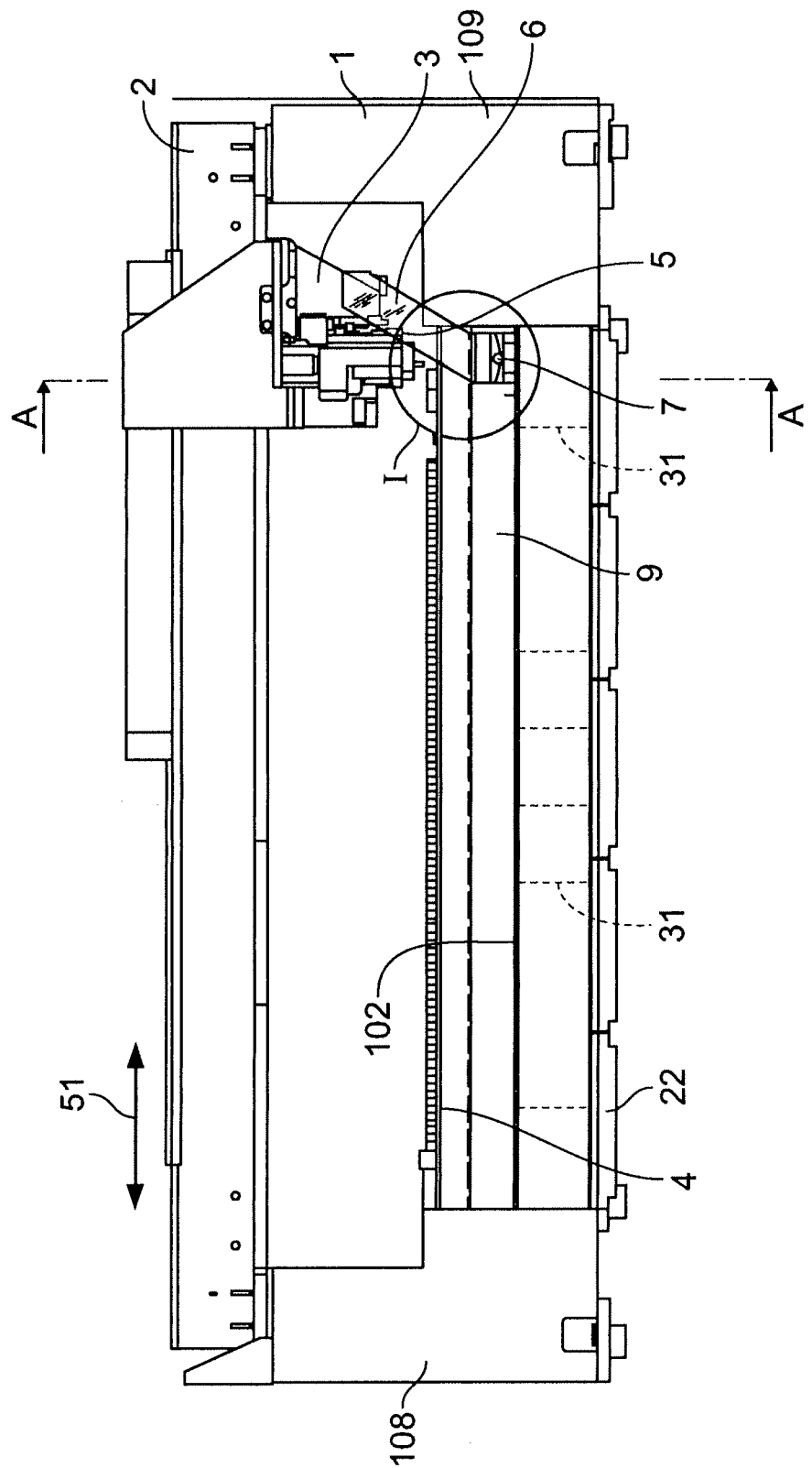
FIG. 1 is a front view of a laser cutting system.

Referring to FIG. 1, a laser cutting system includes a machine frame 1 which includes slots 9 in its front and back walls. The laser cutting system includes a cutting head 5 that is mounted on a motion unit 3 in a conventional manner, supported from a top beam 2. An elongated suction duct 7 is mounted to the motion unit 3 in a manner to allow the suction duct 7 to move with the motion unit 3 along the X-axis 51 and thus with the cutting head 5. Accordingly, only a single motion unit drive (such as a drive motor, associated motor controller and appropriate power transmission components) is needed to move both the motion unit 3 and the suction duct 7. Mounting of the suction duct 7 may be accomplished, e.g., by support brackets 6, the structure of which will be described in detail below. The laser cutting system also includes support slats 4 (FIG. 3) which provide support for a workpiece to be cut by the laser beam emitted from the cutting head 5. Alternatively, in another configuration, each of the motion unit 3 and the suction duct 7 are driven by a respective drive system, the drive systems being controlled to cause a cooperative motion. This latter configuration is particularly useful in machines where it is desired that the workpiece support structure be connected to the machine frame along its sides, and in which providing separate drives enables such support connections.

Figure 2:
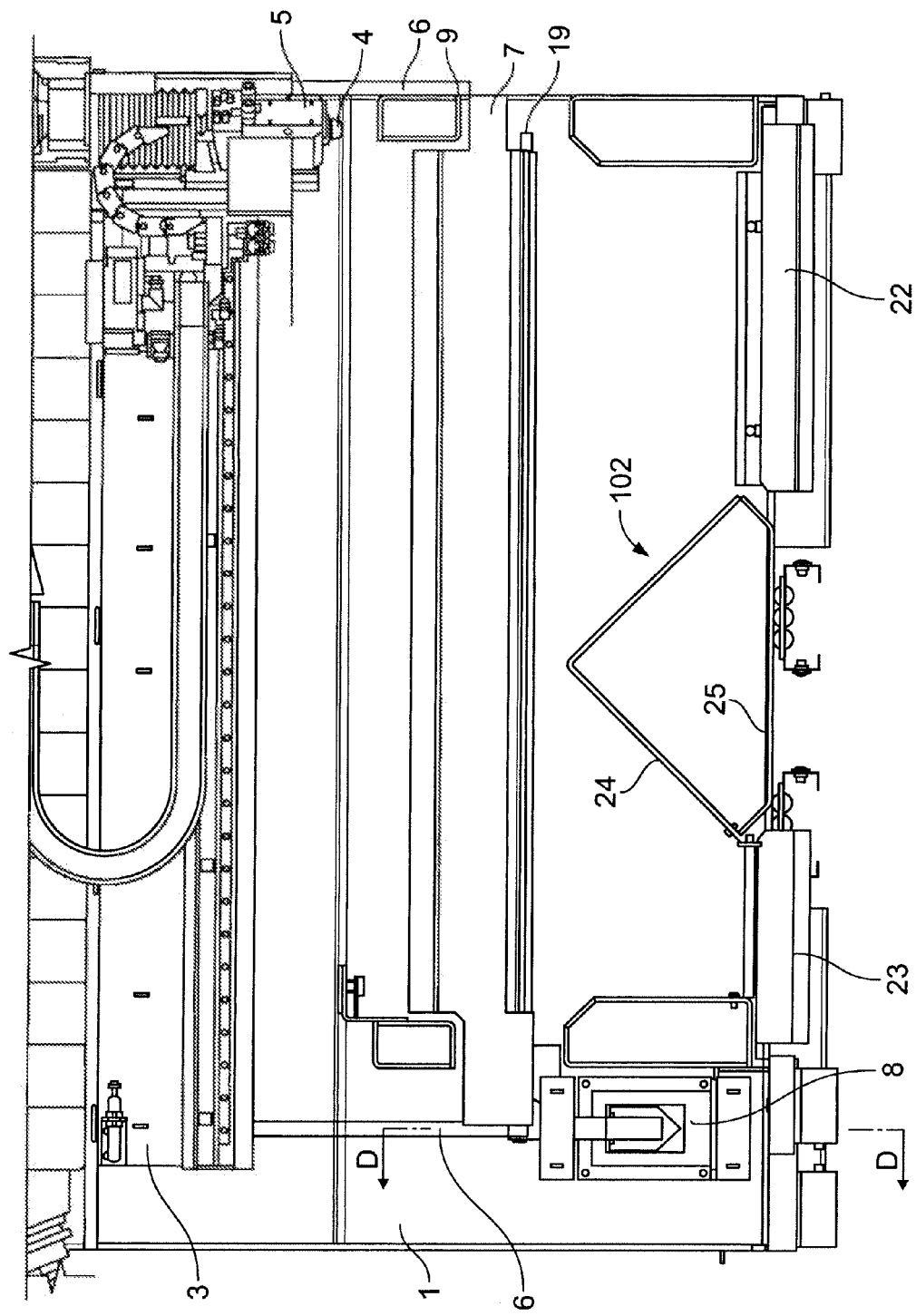
FIG. 2 is a cross-sectional view of the laser cutting system of FIG. 1, taken along line A-A.
Figure 3:
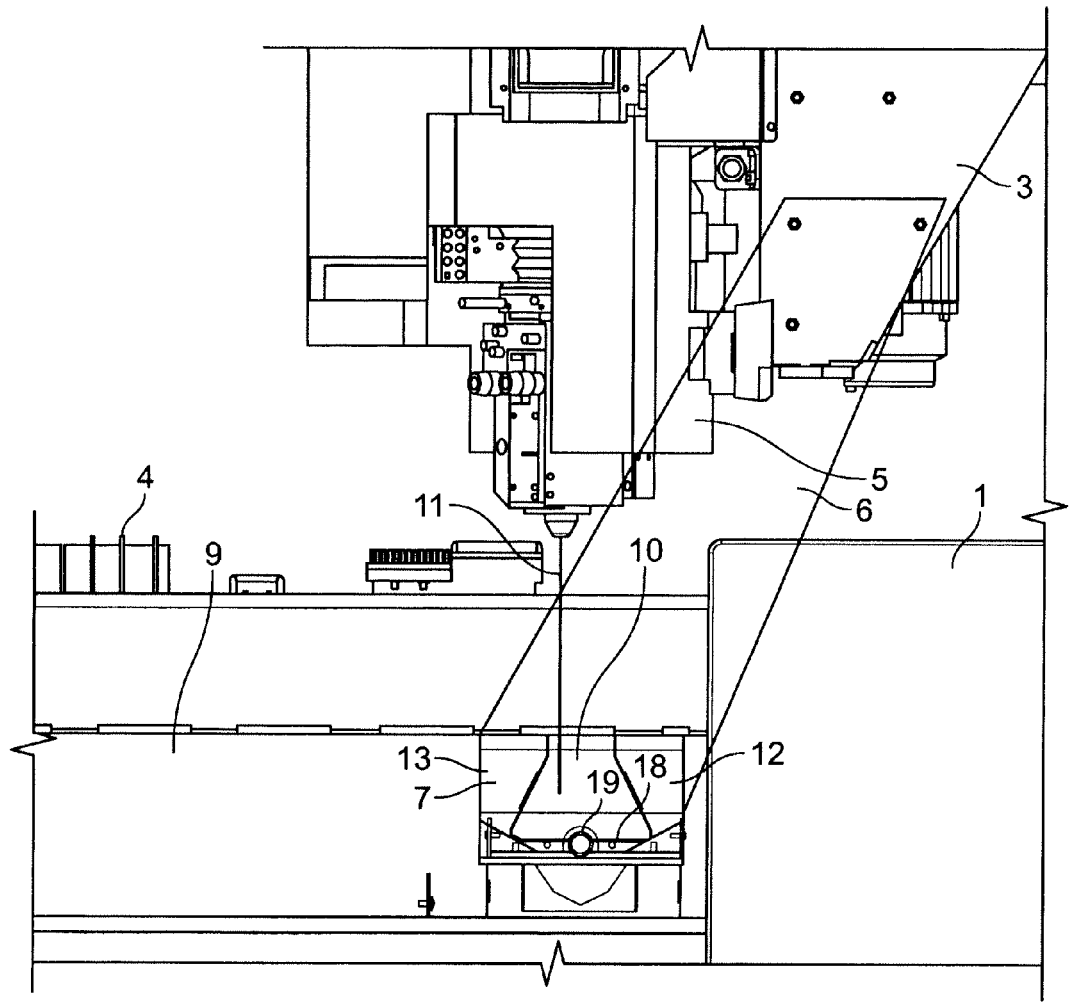
FIG. 3 is an enlarged detail view of area I of FIG. 1.

Referring now to FIGS. 2 and 3, the suction duct 7 moves along slots 9, and, because it is coupled to the motion unit, is positioned at all times with its suction opening 10 and shaft 19 directly below laser beam 11. (Note that the position of the beam 11 is shown slightly offset from its actual position directly aligned with shaft 19). The machine frame 1 includes a frame connecting member 102, formed as a weldment of an upper portion 24 and a base portion 25 (FIG. 2). Six reinforcing steel plates 31 (FIG. 1) are welded within the 4 meter long connecting member 102, spaced more closely near its midpoint. Frame connecting member 102 is positioned directly below the cutting area, which is possible due to the beam containment function of the suction duct 7, which contains the beam from the cutting head at all times. Preferably, the frame connecting member extends the length of the machine frame and is positioned generally centrally, or aligned with an edge of a top beam 2 supporting the motion unit and cutting head, on the subframes 108, 109 at the ends of the machine frame, as shown in FIG. 1. The frame connecting member is generally triangular in cross-section, and thus defines opposed angled surfaces, with the apex of the triangle being positioned closest to the workpiece being cut. Further details of the frame configuration may be found in a patent application filed concurrently herewith, entitled WORKPIECE PROCESSING SYSTEM and assigned Ser. No. 61/167,298, filed Apr. 7, 2009, the entire contents of which are incorporated herein.

Figure 4:
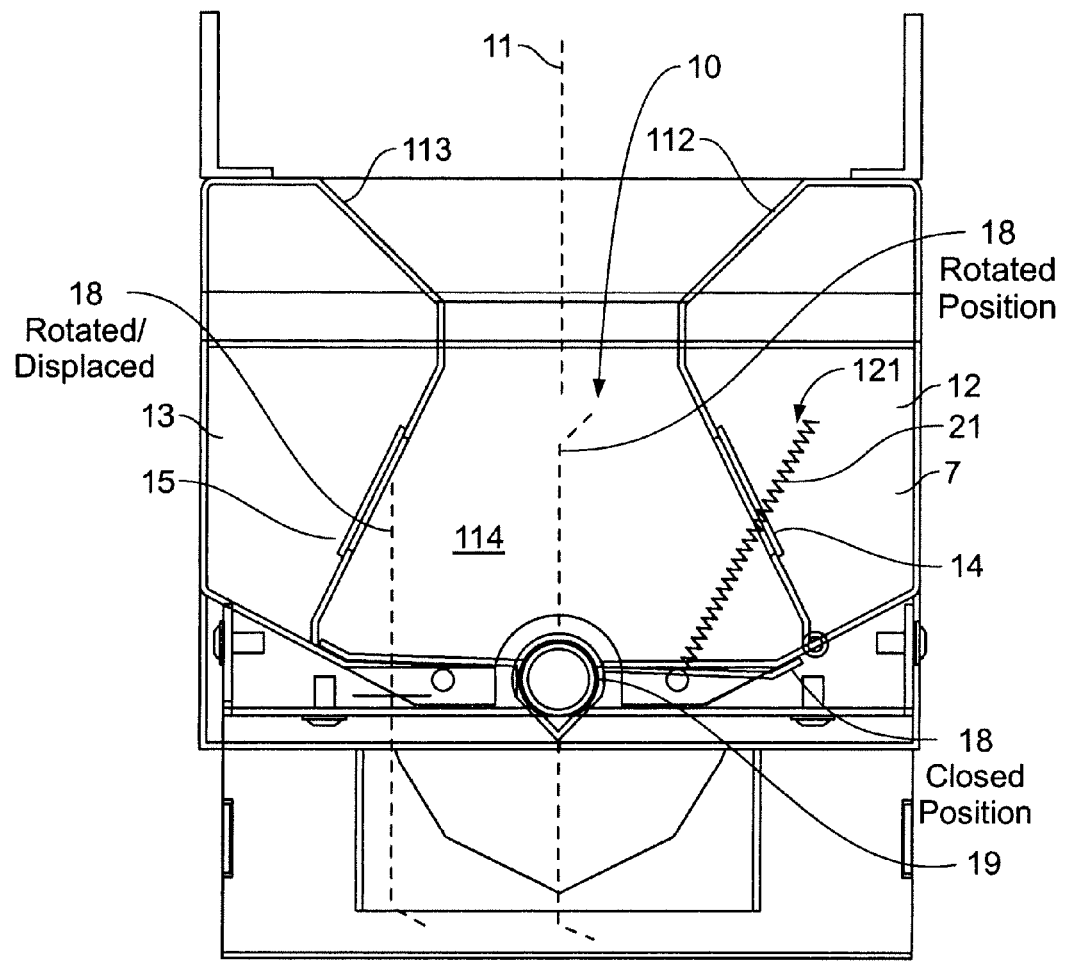
FIG. 4 is an enlarged view of a portion of FIG. 3.
Figure 5:
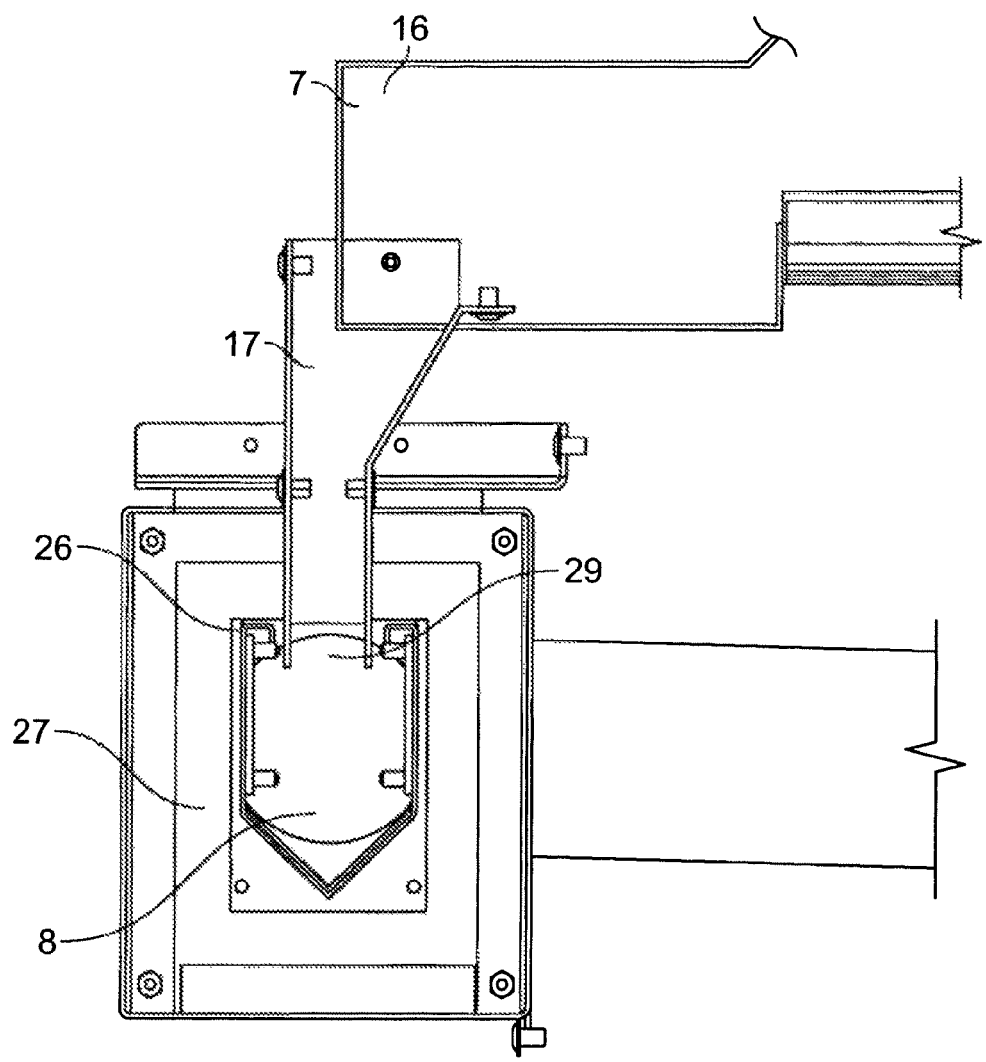
FIG. 5 is an enlarged view of the suction channel shown on the left hand side of FIG. 2 (area II of FIG. 6).
Figure 6:
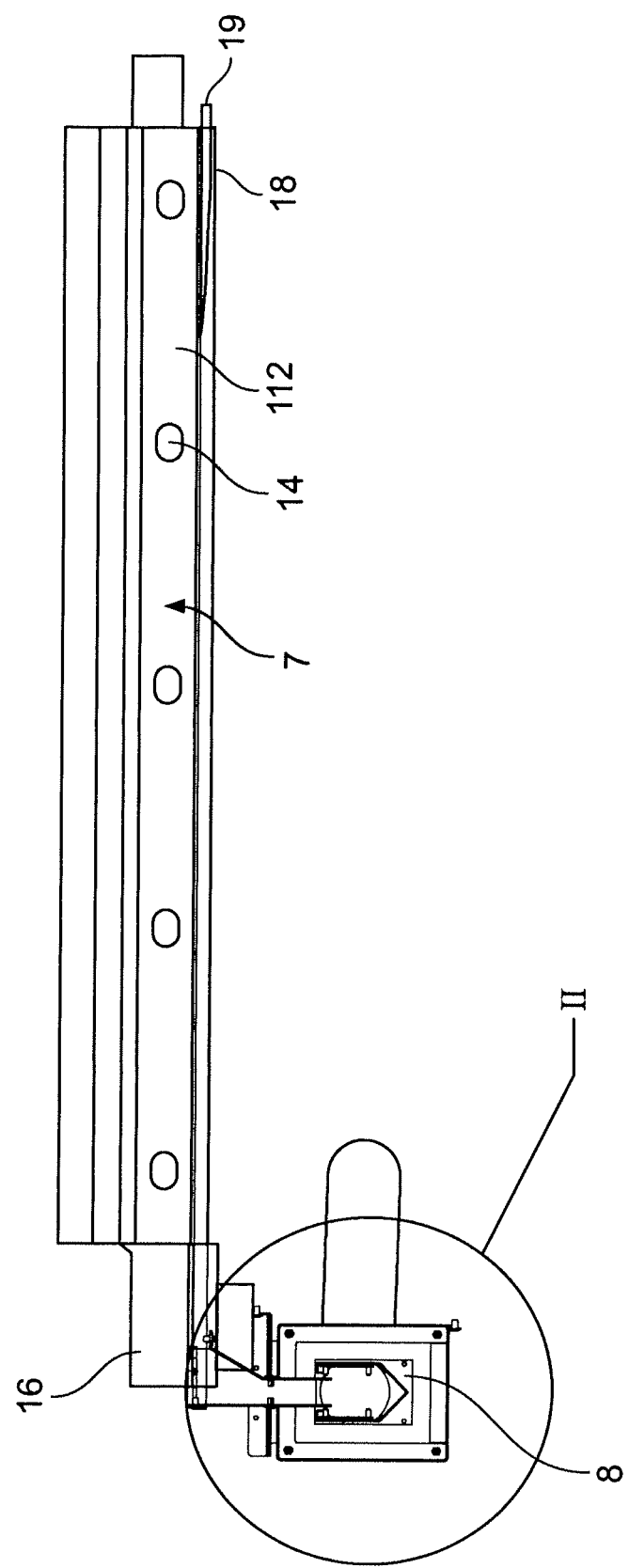
FIG. 6 is a cross-section of the catcher portion of the suction system taken along line A-A in FIG. 1.
Figure 7:
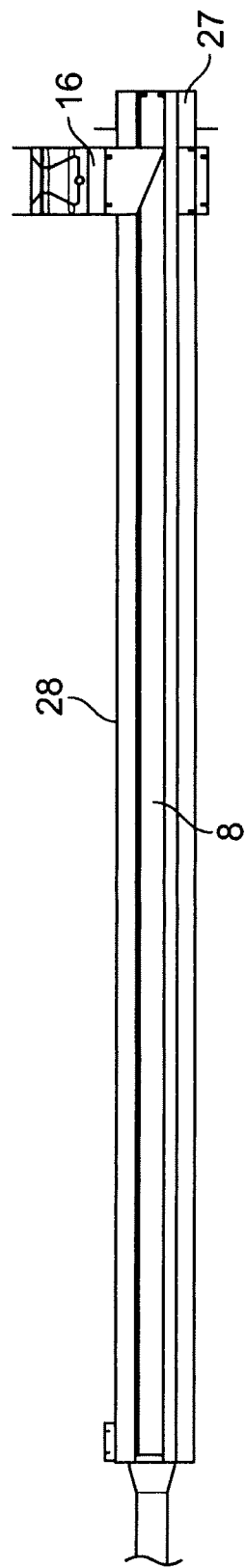
FIG. 7 is a cross-sectional view of the suction channel taken along the line D-D on FIG. 2.

The suction duct 7 includes two side suction chambers 12, 13 (FIGS. 3, 4) which are defined by walls 112, 113 (FIG. 4). Wall 112 includes suction openings 14 (FIGS. 4, 6), which are offset from suction openings 15 in the opposite wall 113. These openings provide vacuum communication between the suction chambers 12, 13 and a central volume 114 that is disposed below the cutting area during operation of the cutting system. The suction openings are offset in order to provide suction close to all cutting positions and to enhance the uniformity of the suction (uniform air speed) over the entire working area of the cutting head. The suction chambers 12, 13, join at one end of the suction duct at an output chamber 16 (FIGS. 5-7). Output chamber 16 is connected by an output duct 17 to a suction channel 8 that is located on the back of the machine frame and which is itself connected to a suction unit (not shown).

During movement of the cutting head, the output duct 17 moves along the length of a member 26 of the suction channel 8 while the member 26 remains stationary. In order to maintain suction during this relative movement, left bellows 27 (FIGS. 5 and 7) and right bellows 28 (FIG. 7) are connected to the lower portion of the duct 17. The left and right bellows alternately expand and contract, in response to movement of the outlet duct 17, which pushes one bellow and pulls the other, to continuously seal the opening 29 of the suction channel member 26. The bellows are preferably formed of a fire retardant or fire resistant material.

During operation of the cutting head to cut a workpiece, fumes, debris and small parts fall into opening 10 of the suction duct 7. Fumes and fine dust move with the air flow through the offset suction openings 14, 15, and are drawn into the suction unit. Larger debris and small parts are discharged by a scrap chute 18 that is disposed at the base of the central volume 114. The scrap chute is movable between three positions, as shown in FIG. 4. In its normal, closed position, the scrap chute 18 seals against the bottoms of walls 112 and 113, preventing egress of scrap and parts. The scrap chute 18 is rotatable and then translatable, in two steps, into a rotated/displaced position in which scrap and parts can be discharged from the suction duct. This movement will now be described in detail.

Referring to FIG. 4, scrap chute 18 is mounted on a shaft 19. The shaft 19 serves as a pivot axis for the scrap chute 18, and also absorbs laser beam energy during cutting. The shaft 19 is water cooled in order to allow it to absorb laser beam energy without overheating and consequent damage.

When a cutting process is completed, the motion unit 3, and thus the suction duct 7, moves beyond the cutting area to a "park" position, e.g., to the right hand position shown in FIG. 1. In this position, the suction duct contacts a fixed stop (not shown) that rotates shaft 19 (clockwise in FIG. 4), extending extension spring 21. Extension spring 21 is connected at its end 121 to an outer surface of the suction duct and to its opposite end to the chute. Thus, spring 21 is extended when the chute 18 opens and acts as a return spring to return the chute 18 to its normal, closed position when the suction duct moves away from the park position.

The chute 18 first rotates 90 degrees to its rotated position, in response to the initial rotation of shaft 19. Further movement of motion unit 3 toward its end of travel causes shifting of the shaft 19 (to the left in FIG. 4). The shaft 19 and connected chute 18 thus move out of the way, providing a large gap for scrap discharge.

Discharged parts and scrap fall into scrap drawers 22,23 (FIGS. 1 and 2), assisted by upper surfaces 24 of the frame connecting member, discussed above, which act as sliding surfaces or ramp members. The cutting system is then ready for the next processing cycle.

When the next processing cycle begins, motion unit 3 moves away from its park position and the spring 21 closes the scrap chute 18. This prepares the suction duct 7 to receive scrap and parts, and positions shaft 19 to absorb laser beam energy, during the next cutting cycle. Shaft 19 is a seamless stainless steel tube with a ⅞ inch (22 mm) outer diameter and a ⅛ inch (3 mm) thickness, mounted to rotate in bores of sealed mounting blocks (not shown) at each end. The shaft diameter is selected to correspond to the laser beam width as it contacts the shaft (widened due to beam divergence, but graphically represented as a narrow line 11). Shaft 19 is cooled by flowing distilled water, such as a 2.8 liters per minute flow along the shaft, during laser cutting. The water may be, for example, the same coolant that cools the mirrors and other temperature-critical components of the machine, routed through the shaft on its way back to the water chiller.

Figure 8:
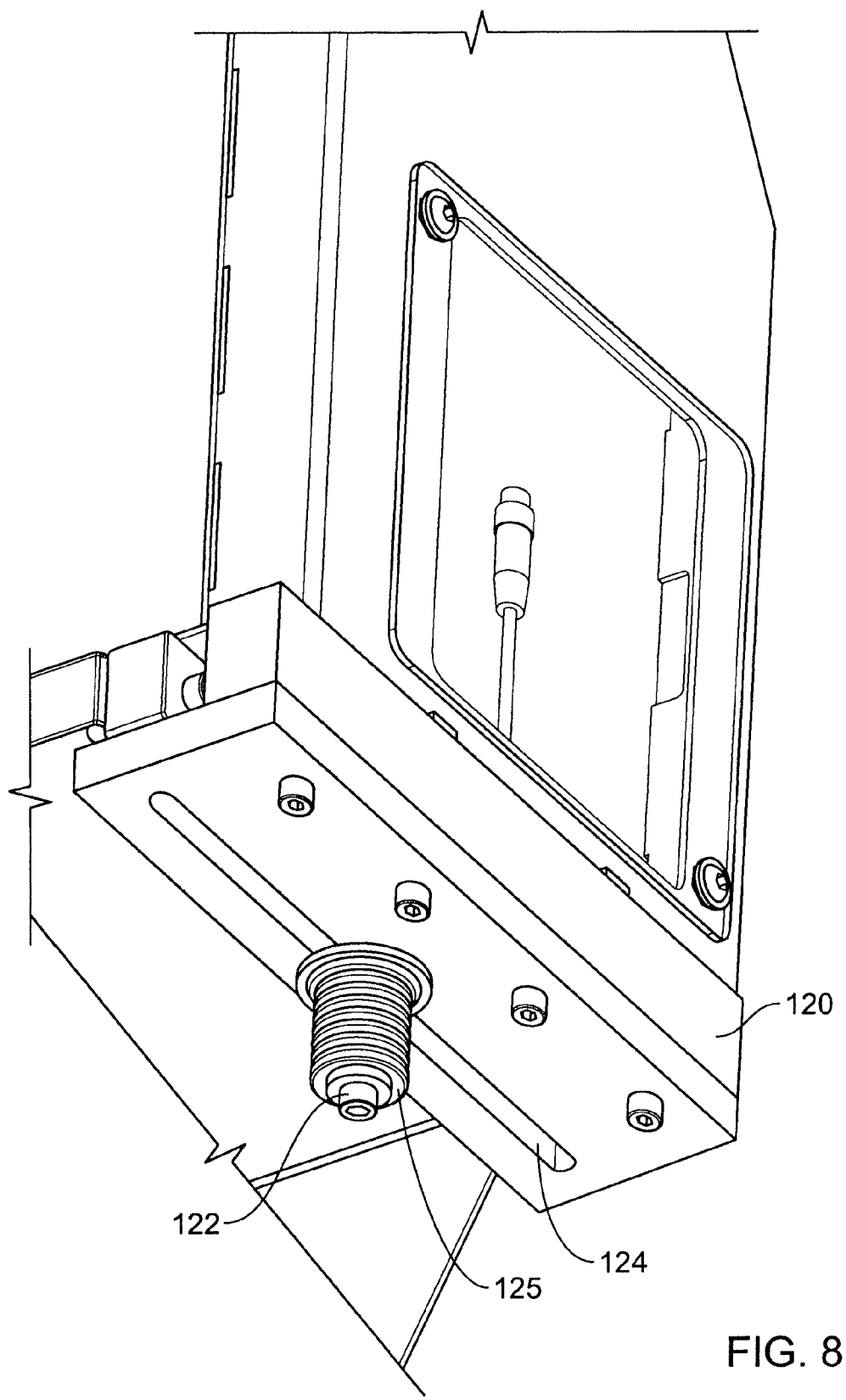
FIGS. 8 and 8A are partial perspective views showing details of the attachment of the catcher portion of the suction system to the motion unit of the cutting system.
Figure 8A:
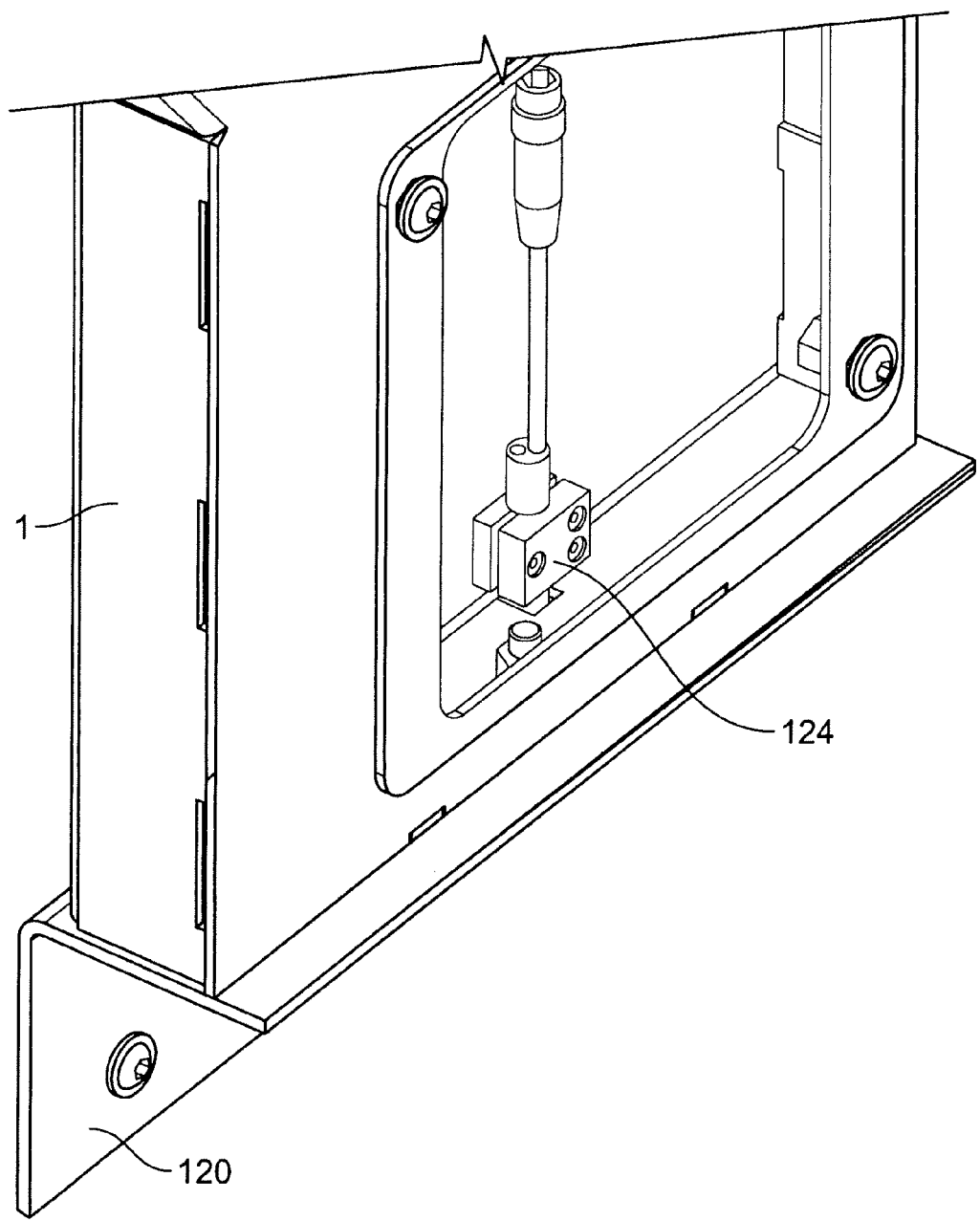

As a safety feature, to prevent damage to the cutting system if a long piece gets caught between the workpiece support (slats 4) and the suction duct 7, the mounting of the suction duct on the motion unit preferably includes a break-away feature. One example of such a feature is shown in FIGS. 8 and 8A. In this implementation, a bracket 120 that connects the motion unit 3 to the suction duct 7 is connected with a single fastener (e.g., screw or bolt) 122 on each side. This fastener is mounted in a slot 124, and is kept at a sufficient preload, maintained by a series of Belleville washers compressed under the head of the fastener, to keep it stationary during normal operation. However, the force of impact during an interlock situation causes the fastener 122 to slide in the slot and activate a switch 126 (FIG. 8A). This switch shuts down the cutting system, preventing catastrophic damage.

A number of embodiments of the invention have been described. Nevertheless, it will be understood that various modifications may be made without departing from the spirit and scope of the invention. For example, while laser cutting systems have been described above, other beam cutting heads may be used, e.g., flame jet cutting. As another example, different rotation/translation mechanisms for chute 18 can be used. Accordingly, other embodiments are within the scope of the following claims.

What is claimed is:

1. A cutting machine comprising:
   a workpiece support;
   a motion unit having an associated drive;
   a cutting head mounted on the motion unit above the workpiece support and configured to deliver a cutting beam to process a workpiece supported on the workpiece support; and
   a suction duct disposed beneath the workpiece support and coupled to the motion unit so that it moves with the motion unit while an opening of the suction duct remains positioned below the cutting head during a cutting operation, wherein the suction duct comprises a shaft configured to absorb energy from the cutting beam when the cutting head is in operation and wherein the shaft is pivotable to open a discharge chute connected to the shaft.

2. The cutting machine of claim 1 wherein the suction duct comprises an elongated channel positioned beneath the workpiece support so as to intercept the cutting beam after it passes the workpiece support.

3. The cutting machine of claim 2 wherein the elongated channel is defined by opposed walls of the suction duct, each wall defining a plurality of spaced suction openings that are offset from suction openings on the other wall.

4. The cutting machine of claim 1 wherein the suction duct defines a suction volume located between a pair of suction chambers that join at one end of the suction duct in an output chamber that is in communication with a suction channel.

5. The cutting machine of claim 4 wherein the output chamber is connected to the suction channel by an output duct that is configured to move within the suction channel.

6. The cutting machine of claim 5 further comprising a sealing device configured to seal the suction channel during movement of the output duct.

7. The cutting machine of claim 6 wherein the sealing device comprises a pair of bellows, each bellow having two ends and being connected at one of its ends to the output duct.

8. The cutting machine of claim 1 wherein the shaft is hollow and is connected to a flow of liquid coolant.

9. The cutting machine of claim 8 wherein the shaft is of a lateral extent sized to correspond to a width of the cutting beam at an elevation of the shaft.

10. The cutting machine of claim 1 wherein the shaft is laterally translatable with the discharge chute in an open position, to increase a discharge chute area.

11. The cutting machine of claim 1 further comprising scrap drawers configured to receive parts and scrap discharged from the discharge chute.

12. The cutting machine of claim 11 further comprising ramp members, positioned below the shaft, forming sliding surfaces that direct parts and scrap into the scrap drawers.

13. The cutting machine of claim 1 further comprising a frame having a central frame member disposed beneath the suction duct and protected from beam energy by the suction duct.

14. The cutting machine of claim 13 wherein the central frame member provides a lifting point from which the entire machine can be lifted and moved.

15. The cutting machine of claim 1 wherein the suction duct is connected to the motion unit through a force-limited connection that allows relative movement between the motion unit and suction duct in response to the suction duct encountering an obstruction during travel.

16. The cutting machine of claim 15 further comprising a shut-off switch responsive to relative movement between the suction duct and motion unit.

17. The cutting machine of claim 1 wherein the cutting beam comprises a laser beam.

18. The cutting machine of claim 1 wherein the cutting beam comprises a flame cutting beam.

19. A cutting machine comprising:
   a workpiece support;
   a motion unit having an associated drive;
   a cutting head mounted on the motion unit above the workpiece support and configured to deliver a cutting beam to process a workpiece supported on the workpiece support;
   a suction duct disposed beneath the workpiece support and coupled to the motion unit so that it moves with the motion unit while an opening of the suction duct remains positioned below the cutting head during a cutting operation, the suction duct defining a suction volume located between a pair of suction chambers that join at one end of the suction duct in an output chamber that is connected to a suction channel by an output duct configured to move within the suction channel; and a sealing device configured to seal the suction channel during movement of the output duct.

20. The cutting machine of claim 19 wherein the sealing device comprises a pair of bellows, each bellow having two ends and being connected at one of its ends to the output duct.

* * * * *